(12) United States Patent
Nishio et al.

(10) Patent No.: US 7,474,455 B2
(45) Date of Patent: Jan. 6, 2009

(54) DEFORMABLE MIRROR

(75) Inventors: Masahiro Nishio, Akiruno (JP); Kenzi Murakami, Hino (JP)

(73) Assignee: Olympus Corporation, Tokyo (JP)

( * ) Notice: Subject to any disclaimer, the term of this patent is extended or adjusted under 35 U.S.C. 154(b) by 110 days.

(21) Appl. No.: 11/710,807

(22) Filed: Feb. 26, 2007

(65) Prior Publication Data

US 2007/0217041 A1 Sep. 20, 2007

(30) Foreign Application Priority Data

Mar. 16, 2006 (JP) ............................. 2006-072368

(51) Int. Cl.
*G02B 26/00* (2006.01)
*G02B 26/02* (2006.01)
*G02B 26/08* (2006.01)

(52) U.S. Cl. ................ 359/291; 359/295; 359/224; 359/231; 359/846

(58) Field of Classification Search ................ 359/290, 359/291, 295, 298, 223, 224, 230, 231, 843, 359/846, 847; 385/16–23; 348/208.1, 208.11, 348/362, E5.028, E5.038; 73/65.01, 514.32; 310/309; 356/505, 521; 248/346.01; 438/29, 438/52; 396/55; 361/280; 216/24
See application file for complete search history.

(56) References Cited

U.S. PATENT DOCUMENTS 5,022,745 A     6/1991  Zayhowski et al. ......... 359/847
5,519,565 A *   5/1996  Kalt et al. ................... 361/280
5,526,172 A *   6/1996  Kanack ....................... 359/291
6,480,645 B1   11/2002  Peale et al. ................... 385/18
6,538,802 B2 *  3/2003  Wang et al. ................. 359/298
7,075,700 B2 *  7/2006  Muenter ...................... 359/291
7,190,500 B2 *  3/2007  Ide et al. ..................... 359/224
2002/0101646 A1  8/2002  Ide et al. ..................... 359/295
2003/0174376 A1  9/2003  Sane et al. ................... 359/237
2005/0286111 A1 12/2005  Muenter ...................... 359/291

FOREIGN PATENT DOCUMENTS

JP          2002-228813         8/2002

* cited by examiner

*Primary Examiner*—Loha Ben
(74) *Attorney, Agent, or Firm*—Scully, Scott, Murphy & Presser, P.C.

(57) ABSTRACT

A deformable mirror includes a deformable section on which a reflecting surface and a COM electrode are formed, a fixing section which fixes the deformable section, a driving and sensing electrode (driving force generating unit) which has a plurality of driving and sensing electrodes provided facing the COM electrode, and which drives the deformable section by applying an electric potential difference between the COM electrode and the driving and sensing electrode, and a capacitance detecting circuit which detects simultaneously a plurality of capacitances between the COM electrode and the driving and sensing electrode.

5 Claims, 20 Drawing Sheets

DEFORMABLE MIRROR

CROSS-REFERENCE TO RELATED APPLICATION

The present application is based upon and claims the benefit of priority from the prior Japanese Patent Application No. 2006-072368 filed on Mar. 16, 2006; the entire contents of which are incorporated herein by reference.

BACKGROUND OF THE INVENTION

1. Field of the Invention

The present invention relates to a deformable mirror which controls a shape of a reflecting surface by using an electrostatic force.

2. Description of the Related Art

A deformable mirror, in which an MEMS (micro electro mechanical system) technology of changing a shape of a reflecting surface by an electrostatic force is used, has hitherto been drawing attention. For controlling the shape of the reflecting surface highly accurately, it is necessary to measure a deformed shape. As a method of measuring the shape of the reflecting surface, a method in which the deformed shape is determined by measuring a change in an electrostatic capacitance as proposed in Japanese Patent Application Laid-open Publication No. 2002-228813 for example, is available.

FIG. 19 shows a structure of a conventional deformable mirror. The conventional deformable mirror includes a piezoelectric control substrate 1 and an upper substrate 5. A flexible thin film 8 having a reflecting surface which is deformed by an electrostatic force of attraction and an upper electrode 6 are formed on the upper substrate 5.

A voltage control circuit 3 and a control electrode 2 which is disposed facing the flexible thin film 8, and which serves as both controlling and for capacity detecting are formed on the piezoelectric control substrate 1. Moreover, external lead electrodes 4 and 7 are formed on these substrates respectively.

The reflecting surface is deformed by an electrostatic driving force which is generated by applying a voltage between the upper electrode 6 and the control electrode 2. An arrangement is made such that it is possible to calculate an amount of deformation of the reflecting surface by calculating a capacitance between the upper electrode 6 and the control electrode 2.

As a structure of a detecting circuit, a structure shown in FIG. 20 is proposed. A high voltage 10a is applied to the control electrode 2 via a resistor. When a high frequency voltage 10b is applied to an electrostatic capacitance detecting electrode 2', an electric potential of the control electrode 2 is changed. This change in the electric potential is monitored as a change in a current at an electrostatic capacitance detecting circuit 6A through the upper electrode 6. From a phase and amplitude of this current, the change in the electrostatic capacitance, in other words, a displacement of the reflecting surface is detected.

In a conventional electrostatic driving type deformable mirror, a structure in which the control electrode 2 is divided into a plurality of electrodes corresponding to one upper electrode 6 in order to change the shape of the reflecting surface freely, has also been taken into consideration. In this case, the capacitance of the plurality of control electrodes 2 is measured one after another. Moreover, a method of determining one after another, the shape of the corresponding reflecting surface, has been shown.

However, in the deformable mirror with a structure having the plurality of control electrodes as described above, the shape of the reflecting surface has to be determined by measuring one after another, the capacitance for each control electrode. Therefore, sometimes the process takes time. Moreover, although it is difficult to determine continuously, particularly to determine simultaneously, an amount of deformation of the reflecting surface at a plurality of positions, it is important to determine in such manner while deforming at a high speed the shape of the reflecting surface.

SUMMARY OF THE INVENTION

The present invention is made in view of the abovementioned difficulties, and it is an object of the present invention to provide a deformable mirror which is capable of detecting simultaneously, an amount of deformation at a plurality of positions of the reflecting surface.

To solve the problems mentioned above, and to achieve an object, according to the present invention, it is possible to provide a deformable mirror including a deformable section on which a reflecting surface and a first electrode are formed, a fixing section which fixes the deformable section, a plurality of second electrodes which are provided facing the first electrode, a driving force generating unit which drives the deformable section by applying an electric potential difference between the first electrode and each second electrode, and a capacitance detecting unit which detects simultaneously a plurality of capacitances between the first electrode and the second electrodes.

Moreover, according to a preferable aspect of the present invention, it is desirable that the capacitance detecting unit includes a reference signal applying unit which applies individually to the second electrode a reference signal having different identifying factors necessary for operation of the capacitance detecting unit, a capacitance detecting unit connected to the first electrode, which detects a full capacitance detection signal in which, a capacitance between the first electrode and the plurality of second electrodes is superimposed, by using the plurality of reference signals, and a detection signal separating unit which separates the full capacitance detection signal into capacitance detection signals corresponding to each of the second electrodes, based on the identifying factors.

Moreover, according to another preferable aspect of the present invention, it is desirable that the identifying factor is a frequency, and the detection signal separating unit separates the signal based on the frequency.

Furthermore, according to still another preferable aspect of the present invention, it is desirable that the identifying factor is a phase, and the detection signal separating unit separates the signal based on the phase.

Moreover, according to still another preferable aspect of the present invention, it is desirable that the capacitance detecting unit includes a reference signal generating unit which applies to the first electrode a reference signal necessary for an operation of the capacitance detecting unit, and a capacitance detecting circuit which is connected to each of the second electrodes, and detects the capacitance between the first electrode and the second electrodes.

DETAILED DESCRIPTION OF THE INVENTION

Exemplary embodiments of a deformable mirror according to the present invention will be described below in detail with reference to the accompanying diagrams. However, the present invention is not restricted to these embodiments.

FIRST EMBODIMENT

Figure 1:
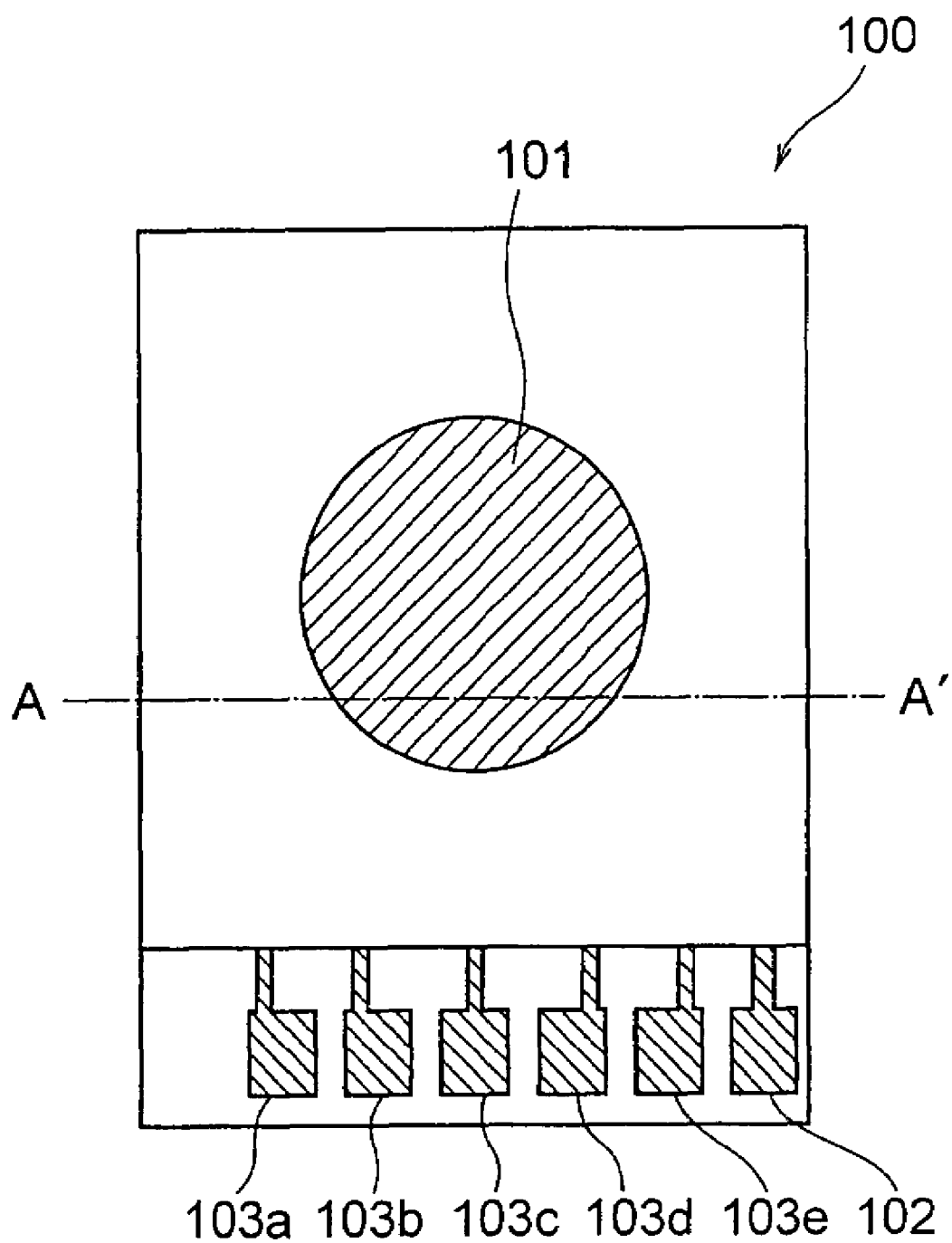
FIG. 1 is a top view of a deformable mirror of a first embodiment of the present invention.
Figure 2:
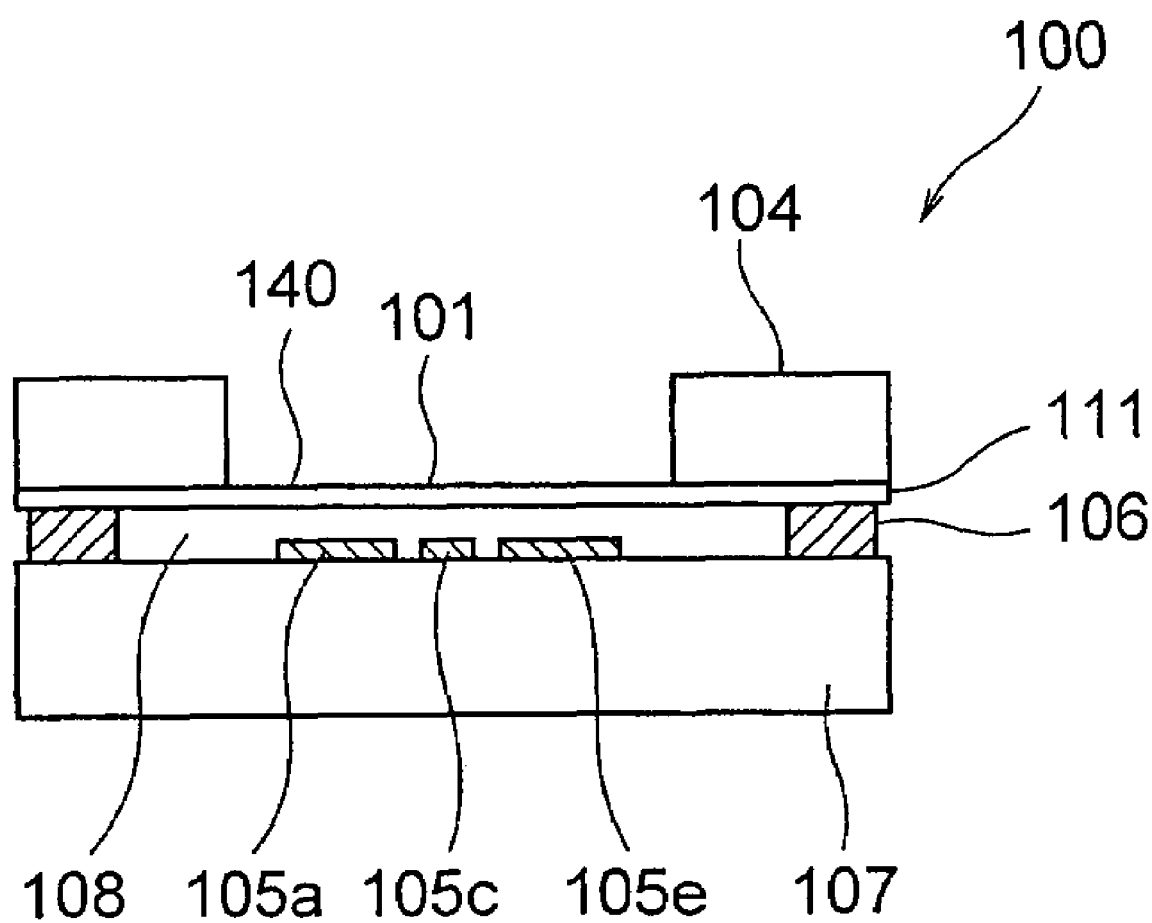
FIG. 2 is a cross-sectional view of the deformable mirror of the first embodiment of the present invention.
Figure 3:
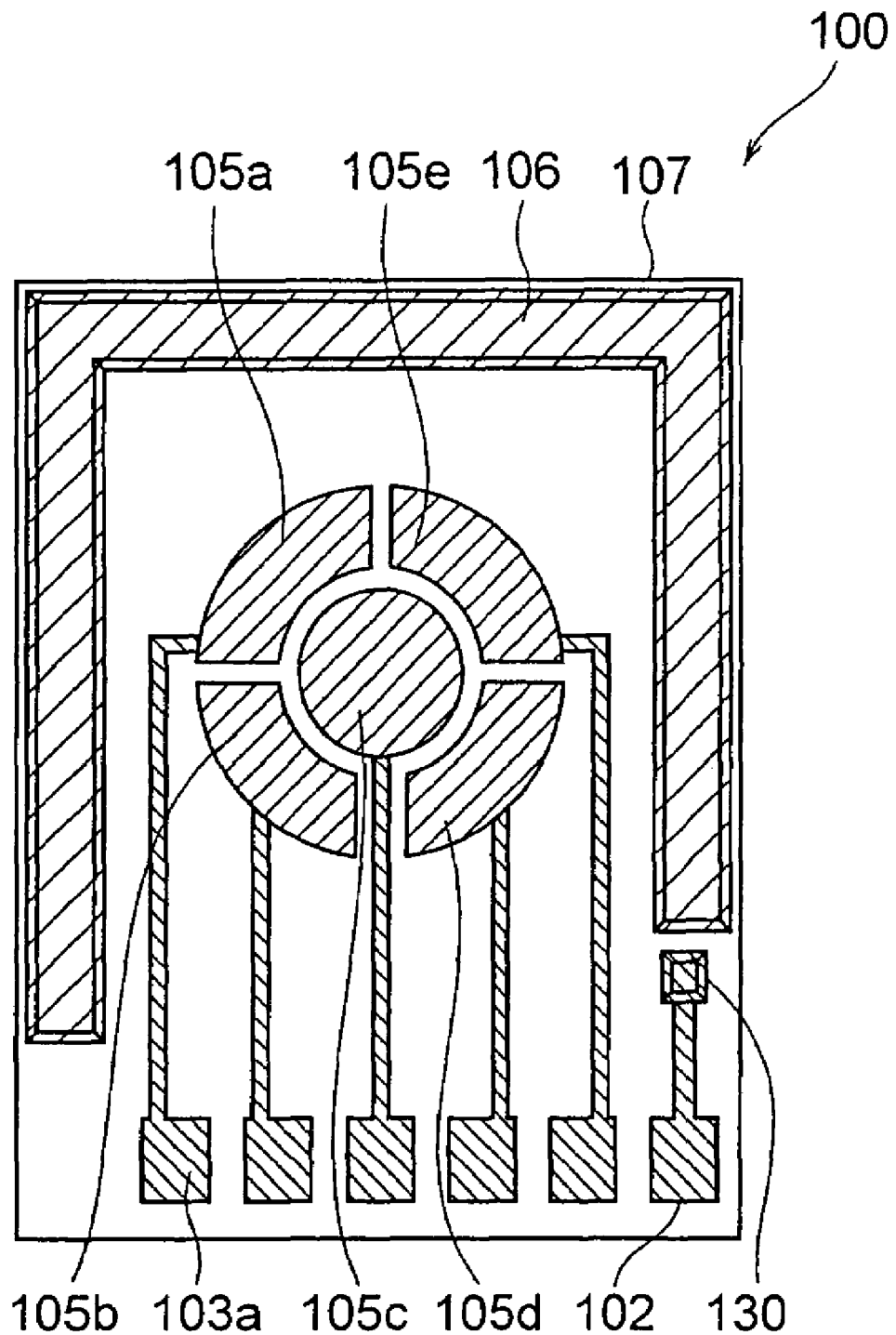
FIG. 3 is a diagram depicting an electrode substrate of the deformable mirror of the first embodiment of the present invention.
Figure 4:
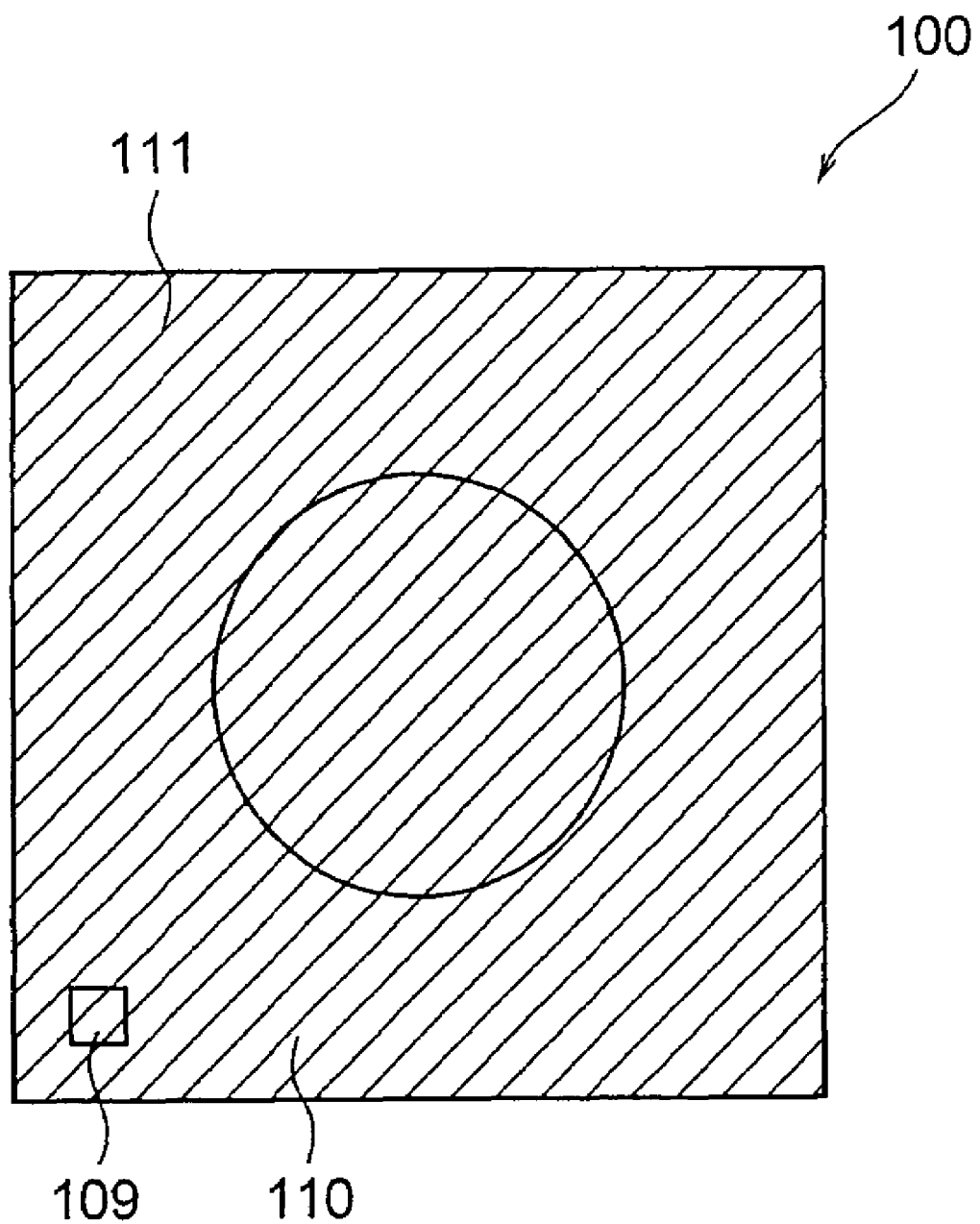
FIG. 4 is a diagram depicting a mirror substrate of the deformable mirror of the first embodiment of the present invention.

A deformable mirror 100 according to a first embodiment of the present invention will be described below. FIG. 1 shows a top view of the deformable mirror 100. FIG. 2 shows a cross-sectional view at a position A-A' shown in FIG. 1. FIG. 3 is a diagram depicting an electrode substrate 107 of the deformable mirror 100. FIG. 4 is a diagram depicting a mirror substrate 111 of the deformable mirror 100. As shown in FIG. 3 and FIG. 4, the deformable mirror 100 can be divided into the electrode substrate 107 and the mirror substrate 111.

As shown in FIG. 3, five driving and sensing electrodes 105a, 105b, 105c, 105d, and 105e which are divided, are disposed in the electrode substrate 107. The driving and sensing electrodes 105a, 105b, 105c, 105d, and 105e are electrically connected by wires to extraction electrodes 103a, 103b, 103c, 103d, and 103e respectively.

In the first embodiment, the driving and sensing electrodes 105a to 105e correspond to the second electrodes. An electric connection from the extraction electrodes 103a to 103e is normally by a wire bonding which is not shown in the diagram.

As shown in FIG. 2, the electrode substrate 107 and the mirror substrate 111 are fixed via a spacer 106. The electrode substrate 107 and the mirror substrate 111 are fixed such that a position facing the driving and sensing electrodes 105a to 105e, and a position of a deformable section 140 formed on the mirror substrate 111 coincide.

The mirror substrate 111 includes a supporting section and the deformable section 140. The supporting section supports the deformable section 140. At the same time, the supporting section is used as a fixing section 104 at the time of fixing the mirror substrate 111 to the electrode substrate 107 via the spacer 106.

Moreover, as shown in FIG. 4, an electroconductive material such as a metal is formed on an entire surface facing the driving and sensing electrodes 105a to 105e of the mirror substrate 111, and is used as a COM electrode 110. The COM electrode 110 corresponds to the first electrode.

When a surface on which the COM electrode 110 is formed is let to be a rear surface, a reflecting surface 101 in which film of a metal is formed on the deformable section 140, is formed on a front surface of the mirror substrate 111. The material for forming the film differs according to specifications of the deformable mirror 100. Materials such as aluminum, gold, and a dielectric multilayer film can be used preferably. In a case of a metal such as aluminum, which is oxidized, it is desirable to coat a surface by a material such as silicon oxide etc.

Moreover, the spacer 106 is used for fixing while securing a distance between the electrode substrate 107 and the mirror substrate 111. Inorganic materials such as glass and silicon substrate, and a metal can be used as a material for the spacer 106. Apart from this, an organic adhesive including beads can be used for securing the distance between the electrode substrate 107 and the mirror substrate 111.

The COM electrode 110 formed on the mirror substrate 111 is electrically connected to an extraction electrode for COM 102 (refer to FIG. 1) formed on the electrode substrate 107. Therefore, a part of the COM electrode 110 on the supporting section of the mirror substrate 111 is let to be a connecting section. Moreover, the connecting section, at the time of fixing the mirror substrate 111, is electrically connected to an electroconductive material for electrical connection 130 (refer to FIG. 2 and FIG. 3) formed on the electrode substrate 107. The electrical connection may be made by pressure welding of a metal, or by an electroconductive paste. As a result of this, the COM electrode 110 on the mirror substrate 111, and the extraction electrode for COM 102 on the electrode substrate 107 are connected electrically.

An electrostatic driving method of deforming the reflecting surface 101 on the deformable section 140 by an electrostatic force is adopted for the deformable mirror 100 of the first embodiment. The electrostatic force can be generated by applying an electric potential difference between the COM electrode 110 and the driving and sensing electrodes 105a to 105e. Since the electrostatic force generates an attracting force, the reflecting surface 101 is deformed toward the electrode substrate 107 along with the deformable section 140.

A distance between the electrode substrate 107 and the mirror substrate 111, which is determined by a height of the spacer 106, can be determined from a maximum amount of deformation of the reflecting surface 101. Generally, a substrate distance three times of the maximum amount of deformation is desirable.

The deformation of the reflecting surface 101 can be controlled by taking into consideration at the time of applying the voltage with the COM electrode 110 as a GND (ground), as to which driving and sensing electrode from among the plurality of driving and sensing electrodes 105a to 105e which are disposed upon dividing the voltage is to be applied to, and as to what voltage is to be applied.

Figure 5:
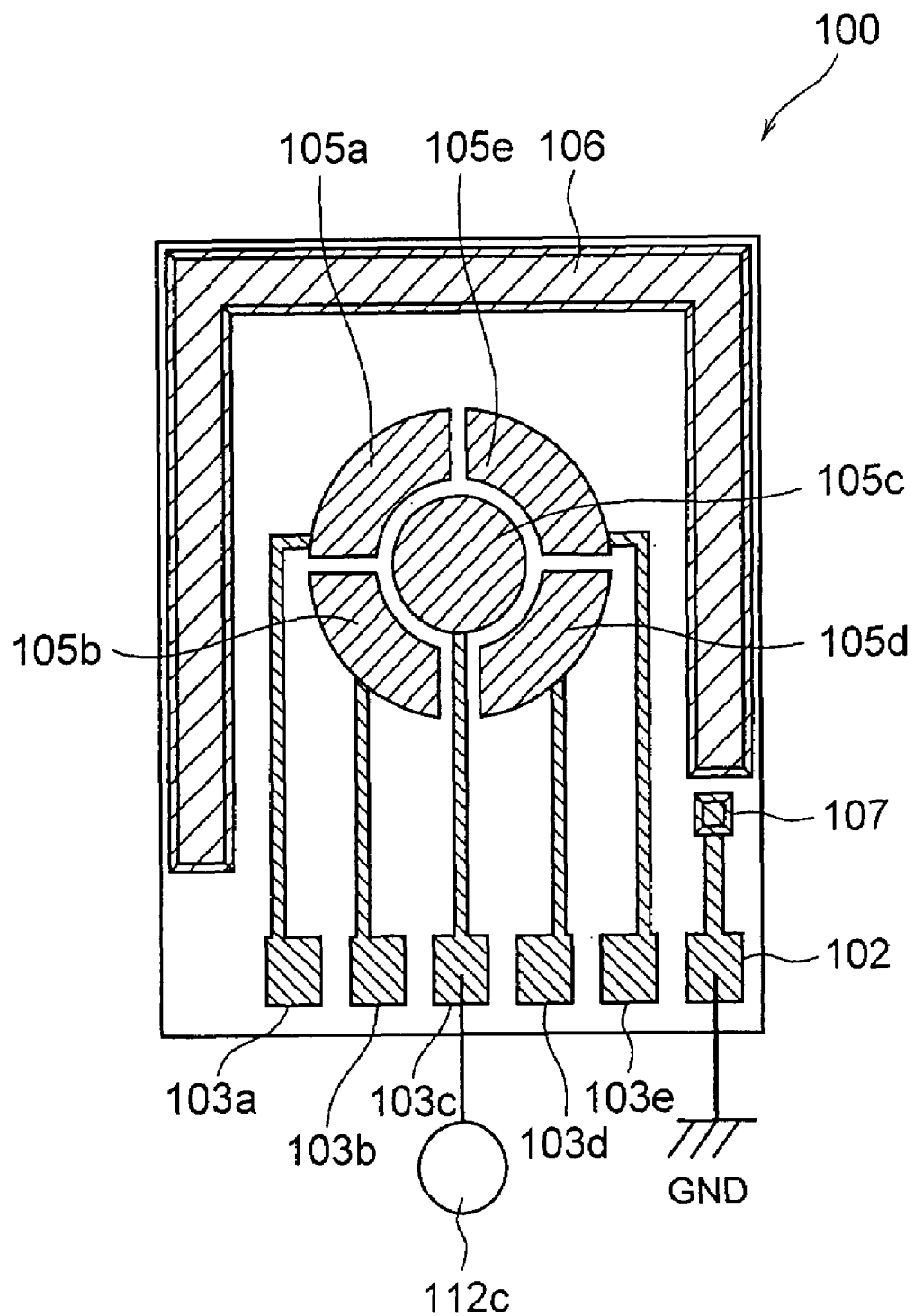
FIG. 5 is a diagram showing an arrangement for driving an electrode in a central portion of the first embodiment of the present invention.
Figure 6:
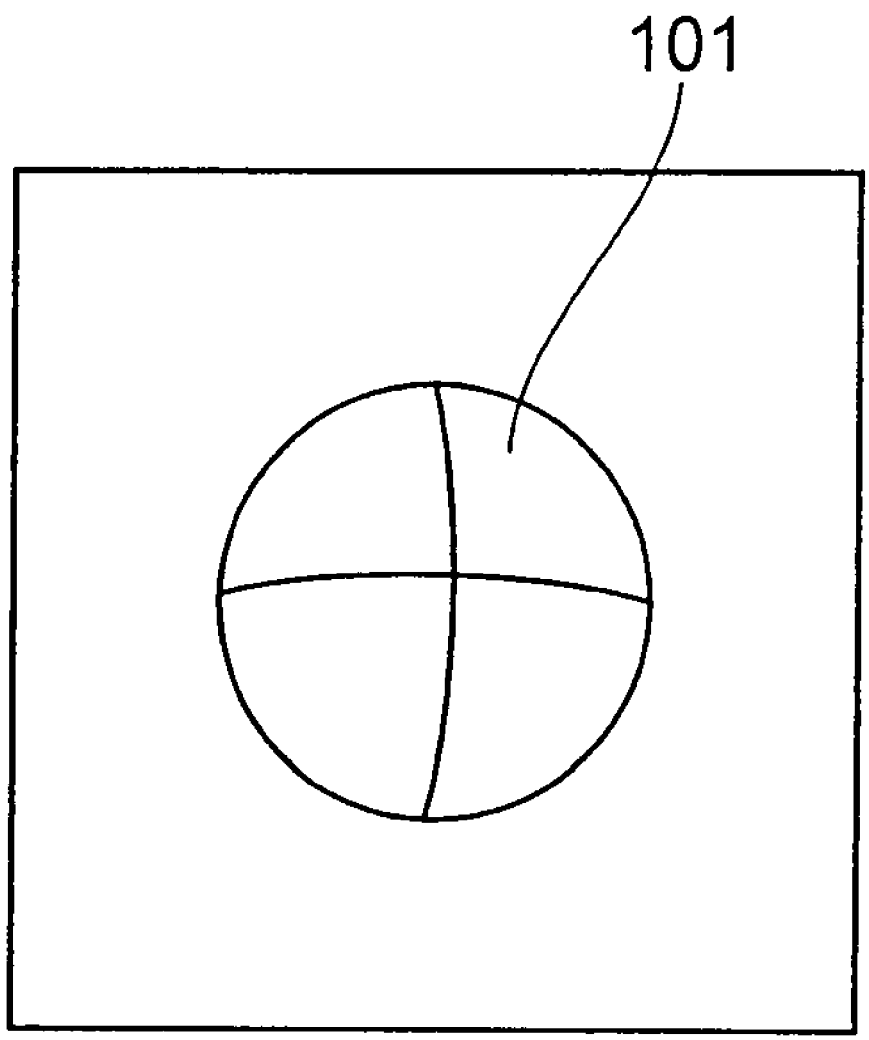
FIG. 6 is a top view showing a deformation of a reflecting surface when the electrode in the central portion is driven.
Figure 7:
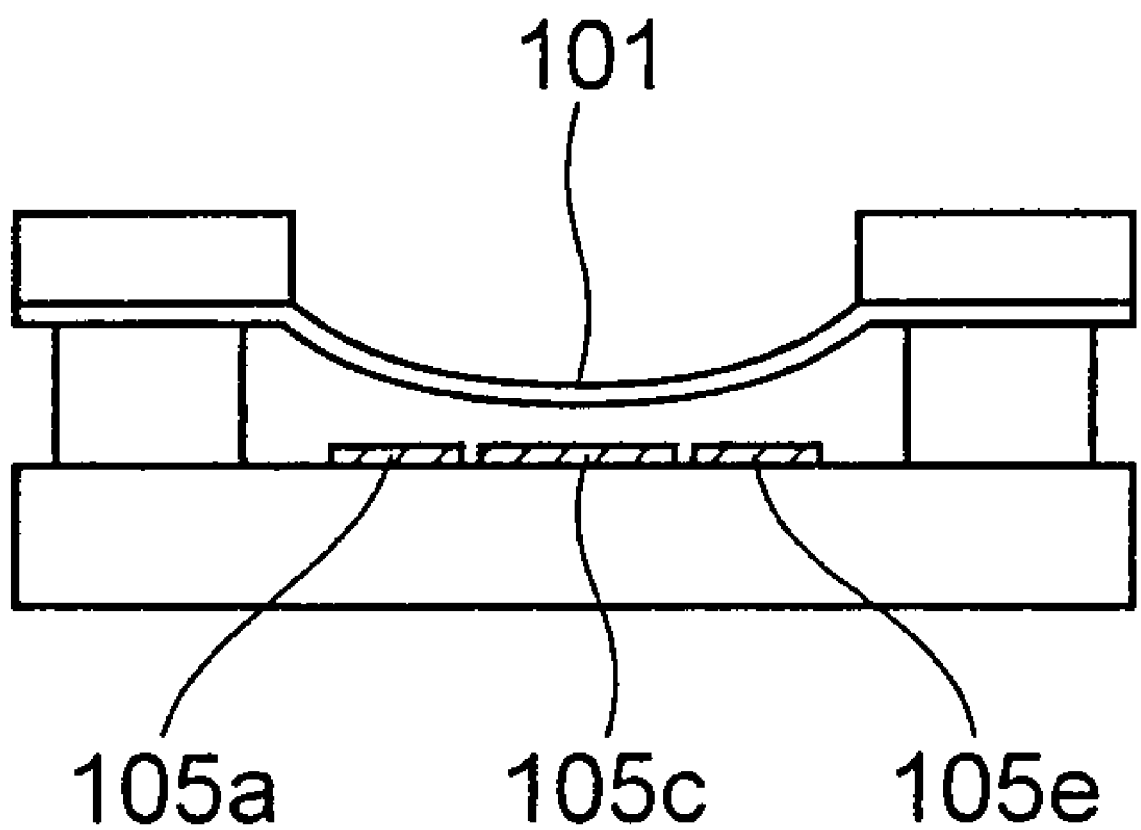
FIG. 7 is a cross-sectional view showing the deformation of the reflecting mirror when the electrode in the central portion is driven.

For example, as shown in FIG. 5, a case in which the voltage is applied by a driving signal generator 112c to the driving and sensing electrode 105c disposed at the center, from among the plurality of driving and sensing electrodes, will be taken into consideration. In this case, as shown in a top structural view in FIG. 6 and a cross-sectional structural view in FIG. 7, it is possible to make a shape in which a central area of the reflecting surface 101 is deformed substantially.

Figure 8:
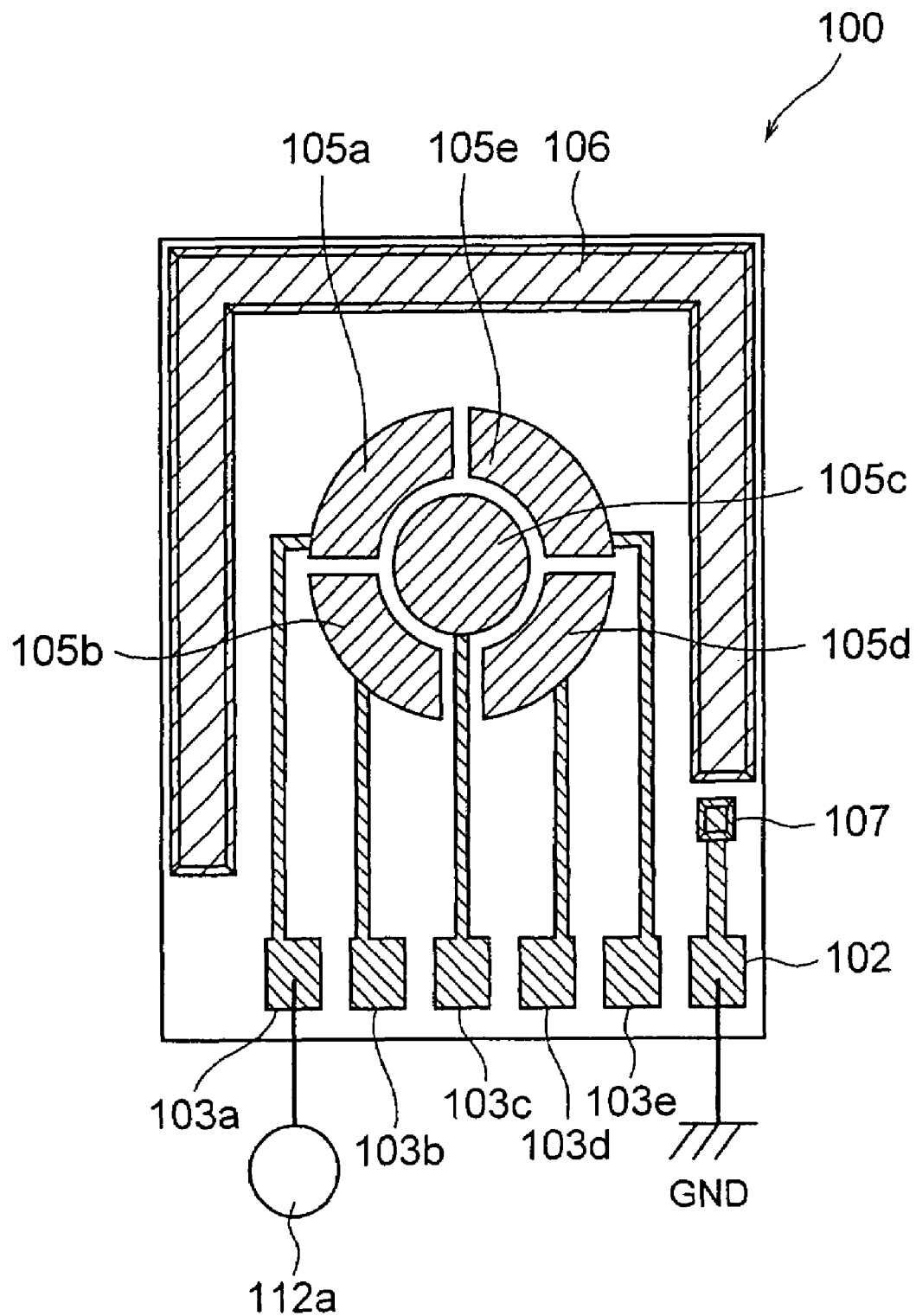
FIG. 8 is a diagram showing an arrangement for driving the other electrode of the first embodiment.
Figure 9:
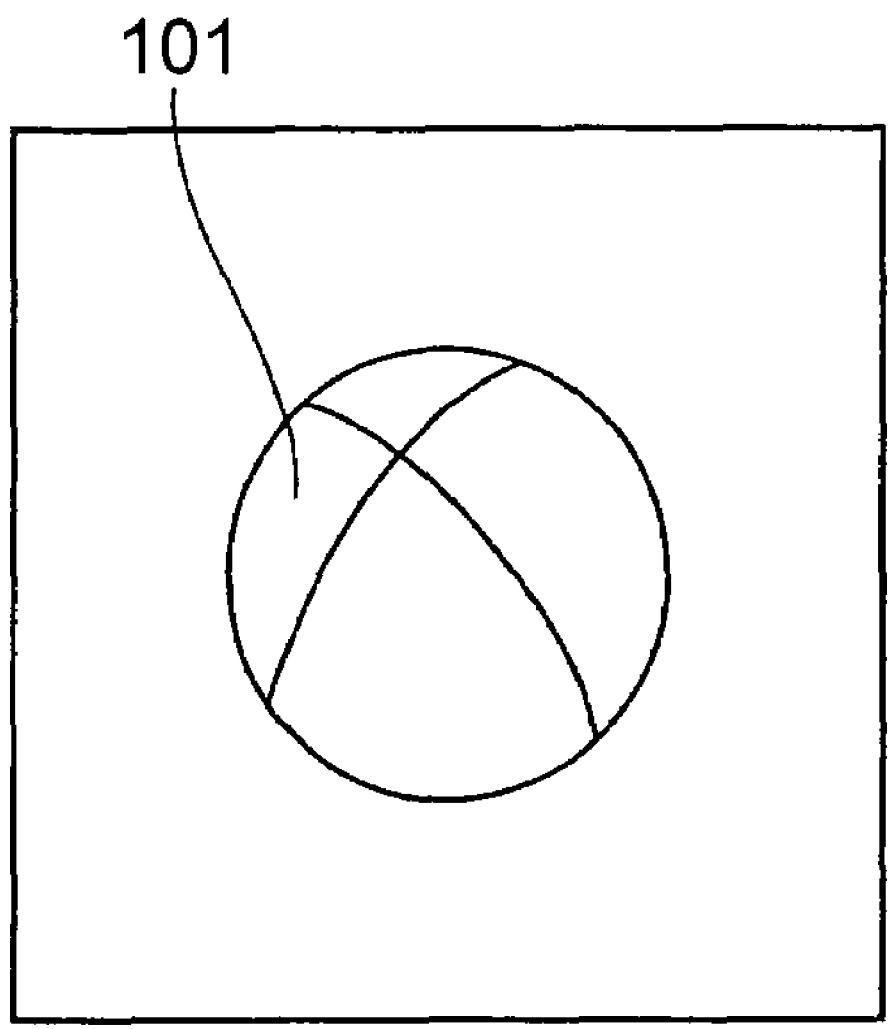
FIG. 9 is a diagram showing the deformation of the reflecting surface when the other electrode is driven.
Figure 10:
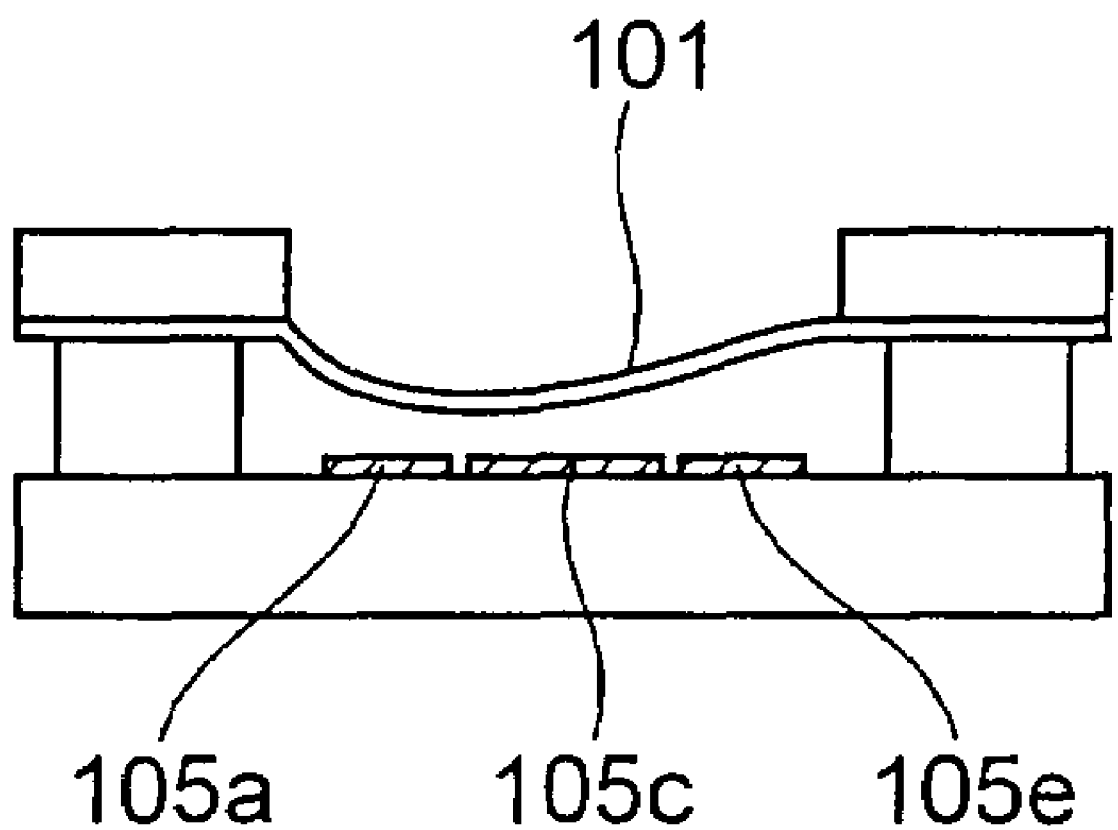
FIG. 10 is a cross-sectional view showing the deformation of the reflecting surface when the other electrode is driven.

Moreover, as shown in FIG. 8, a case of applying the voltage by a driving signal generator 112a to the driving and sensing electrode 105a disposed at an upper left portion in the diagram will be taken into consideration. In this case, as shown in a top structural view in FIG. 9 and a cross-sectional structural view in FIG. 10, a shape in which an area facing the driving and sensing electrode 105 of the reflecting surface 101 is deformed substantially, is made.

Further, although it is not shown in the diagram, by changing the amount of voltage to be applied to the driving and sensing electrodes 105a, 105b, 105c, 105d, and 105e, it is possible to make the reflecting surface 101 to have a complex concave shape. For example, the driving signal generator 112a, the driving and sensing electrode 105a, and the COM electrode 110 correspond to the driving force generating means. Furthermore, although a driving signal generator 112d etc. are not shown in the diagram, the correspondence relationship with the driving force generating unit (means) in the driving and sensing electrodes 105b to 105e is similar.

Next, a procedure for sensing the shape of the reflecting surface of the deformable mirror 100 will be described below. It is possible to dispose any number of the driving and sensing electrodes 105a to 105e. However in this case, for the sake of simplicity, the description is made by giving an example of a deformable mirror unit 150 having the two driving and sensing electrodes 105a and 105b.

The following description is made by giving an example in which the driving and sensing electrode 105a is used for driving. Corresponding driving signal generator 112b, a reference signal generator 120b, and a signal superimposing unit 121b are connected to the driving and sensing electrode 105b with a same arrangement as for the driving and sensing electrode 105a.

The deformable section 140 is deformed by generating an electrostatic force between the driving and sensing electrodes 105a and 105b, and the COM electrode 110. At this time, a distance between the driving and sensing electrodes 105a and 105b, and the COM electrode 110 (hereinafter called appropriately as "electrostatic gap 108". Refer to FIG. 2), is decreased.

Figure 11:
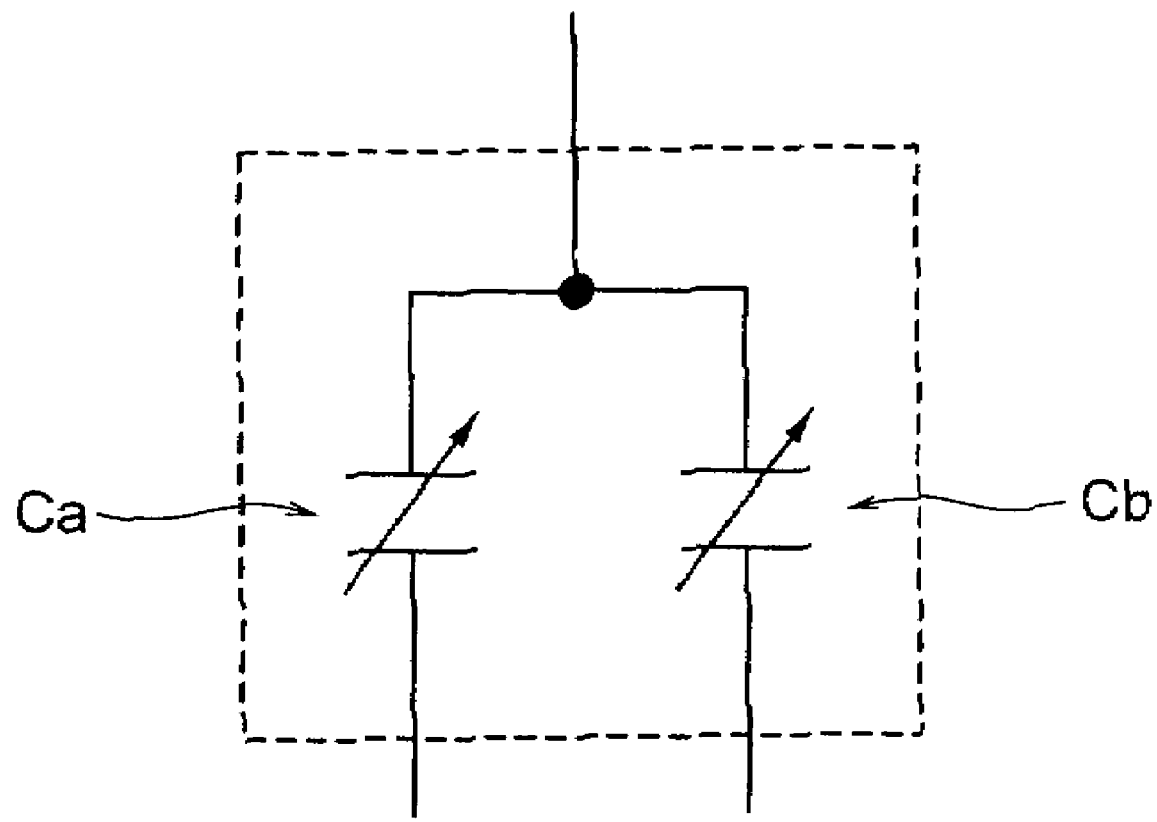
FIG. 11 is a diagram showing an equivalent circuit of a deformable mirror.

When this is considered as an equivalent circuit shown in FIG. 11, it is equivalent to a phenomenon that in accordance with the decrease in the electrostatic gap 108, an electrostatic capacitance Ca and Cb between the driving and sensing electrode 105a and the COM electrode 110b is increased.

For example, when the deformation differs at two different positions of the reflecting surface 101, for two independent electrostatic capacitances, a capacitance change corresponding to a change in the electrode distance respectively is generated. By measuring these electrostatic capacitance values, it is possible to detect the electrostatic gap 108 corresponding to each amount of change. Consequently, when the electrostatic capacitance values are measured, it is possible to detect the deformed shape of the reflecting surface 101.

Figure 12:
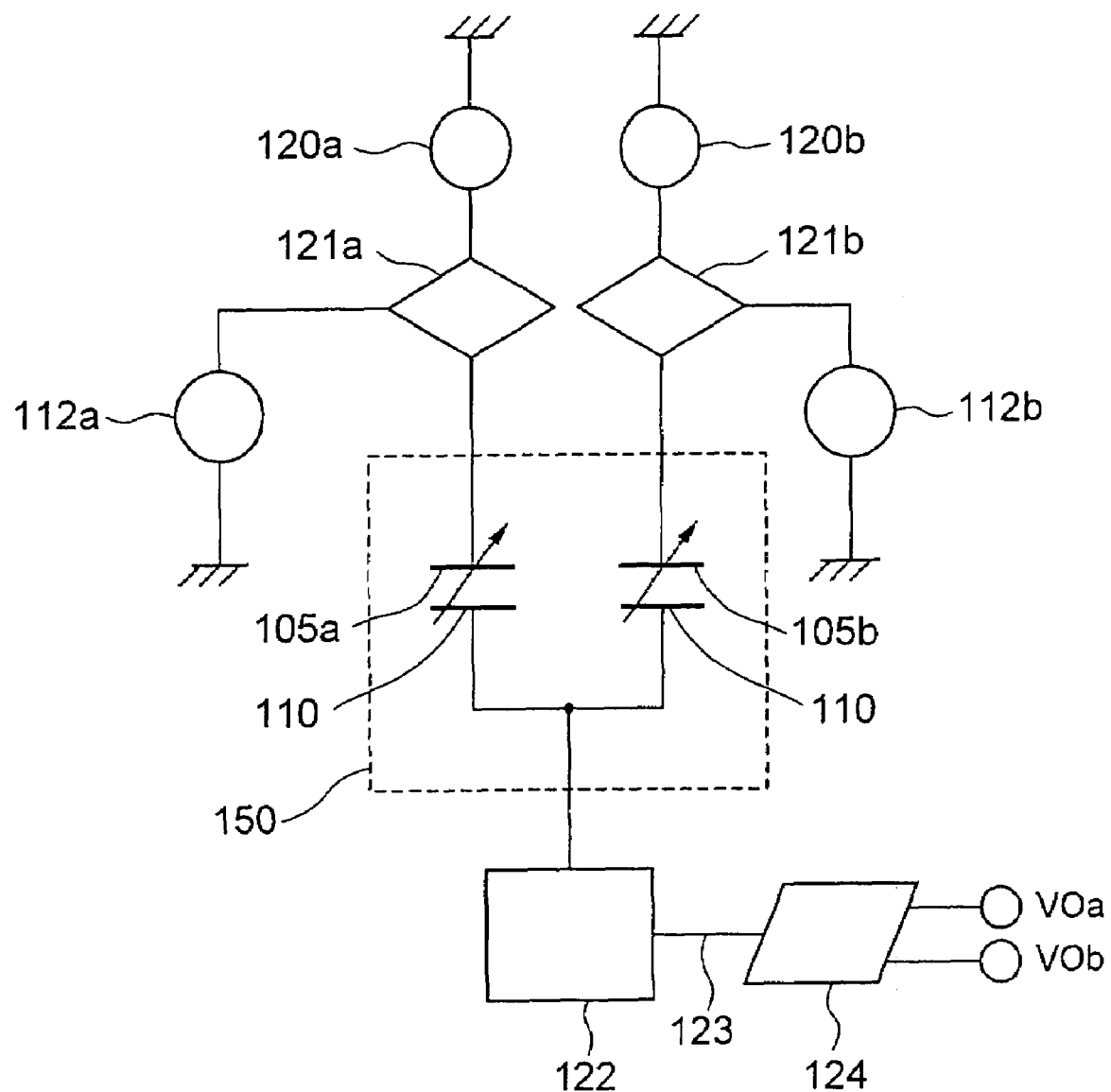
FIG. 12 is a block diagram describing a capacitance detecting circuit of the first embodiment.

In the first embodiment, a circuit structure for detecting the electrostatic capacitance will be described below. FIG. 12 shows a block diagram of a circuit which detects a capacitance between the driving and sensing electrodes 105a and 105b, and the COM electrode 110, for an equivalent circuit of the deformable mirror unit 150. In the diagram, the COM electrode 110 is common, and is connected by wires. Moreover, in the equivalent circuit of the deformable mirror unit 150, the COM electrode 110 is shown at a bottom side in the diagram.

In FIG. 12, the deformable mirror unit 150 is driven by applying a driving signal (voltage) from the driving signal generator 112a to the driving and sensing electrode 105a, for the COM electrode 110. A reference signal for detecting the capacitance between the driving and sensing electrode 105a and the COM electrode 110 is applied further to the driving and sensing electrode 105a.

The driving signal generator 112a and a reference signal generator 120a are connected to a signal superimposing unit 121a. The driving signal and the reference signal are superimposed by the signal superimposing unit 121a, and applied to the driving and sensing electrode 105a of the deformable mirror unit 150.

The reference signal is a signal having a periodicity. Here, a case in which a sinusoidal wave is used will be described. However, without restricting to the sinusoidal wave, any waveform such as a rectangular wave, a triangular wave, and further a periodic wave can be used.

It is possible to detect the electrostatic capacitance value by detecting an impedance of the electrostatic capacitance by applying the abovementioned reference signal to the electrostatic capacitance, or by detecting an electric charge which is charged in the electrostatic capacitance. Here, the reference signal is not only used for detection of the electrostatic capacitance value, but also for generating a driving force. Consequently, it is necessary to make a frequency of the reference signal sufficiently higher than an operating frequency band. Moreover, it is desirable to set the frequency of the reference signal avoiding a higher order resonance frequency of the deformable section 140.

Figure 13:
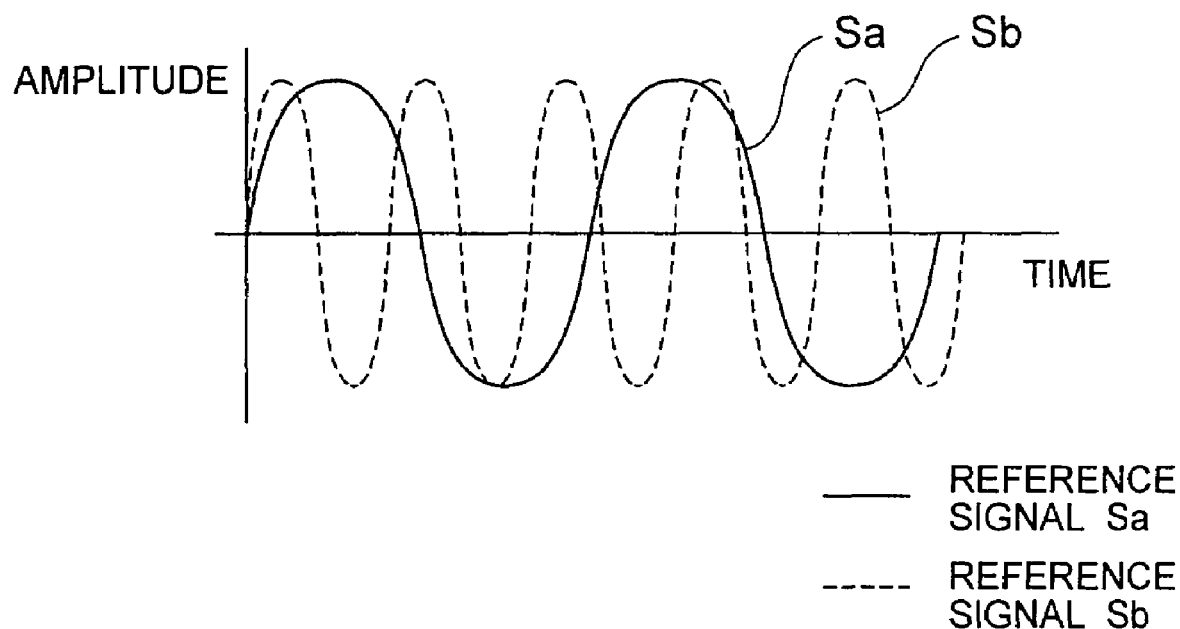
FIG. 13 is a diagram showing a reference signal.
Figure 14:
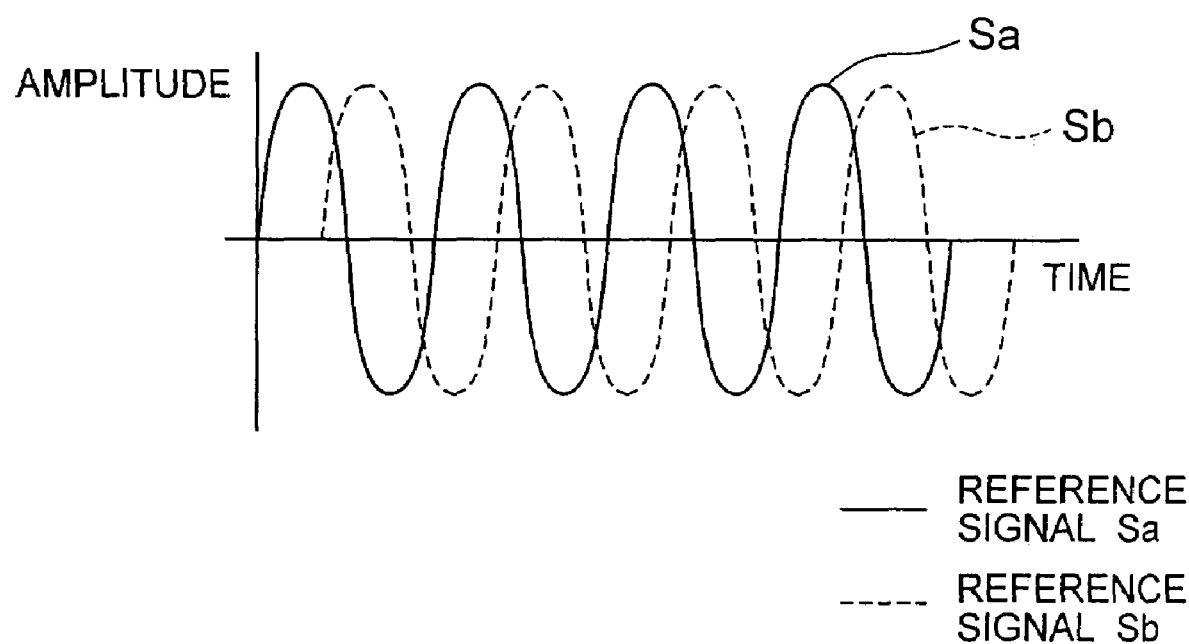
FIG. 14 is another diagram showing the reference signal.

Each of the reference signals to be applied to the driving and sensing electrodes 105a and 105b respectively are assigned peculiar characteristics, in other words, identifying factors. For example, as reference signals Sa and Sb corresponding to the driving and sensing electrodes 105a and 105b, signals having a different frequency as shown in FIG. 13, or signals having a different phase as shown in FIG. 14 can be used.

The peculiar characteristics (identifying factors) assigned to each of the reference signals Sa and Sb, are used for identifying the driving and sensing electrodes 105a and 105b, at the time of detecting the electrostatic capacitance.

The reference signals Sa and Sb which are applied to the driving and sensing electrodes 105a and 105b respectively, change based on the capacitance between the driving and sensing electrodes 105a and 105b, and the COM electrode 110, and are output to the COM electrode 110. At this time, the signal output from the COM electrode 110 is a signal in which the signals based on the reference signals Sa and Sb are superimposed.

A capacitance detecting circuit 122 outputs upon converting the signal output from the COM electrode 110 to a full capacitance detection signal 123 in which the capacitance of the driving and sensing electrodes 105a and 105b are superimposed. After outputting, the full capacitance detection signal 123 is separated into capacitance detection signals VOa and VOb corresponding to the driving and sensing electrodes 105a and 105b respectively, by a detection signal separating unit 124.

Next, each of the signal superimposing unit 121a, the capacitance detecting circuit 122, and the detection signal separating unit 124 will be described below.

(Signal Superimposing Unit)

The signal superimposing unit 121a is connected to the driving signal generator 112a, the reference signal generator 120a, and the driving and sensing electrode 105a. The signal superimposing unit 121a has a function of superimposing the driving signal and the reference signal, and applying to the driving and sensing electrode 105a.

Figure 15:
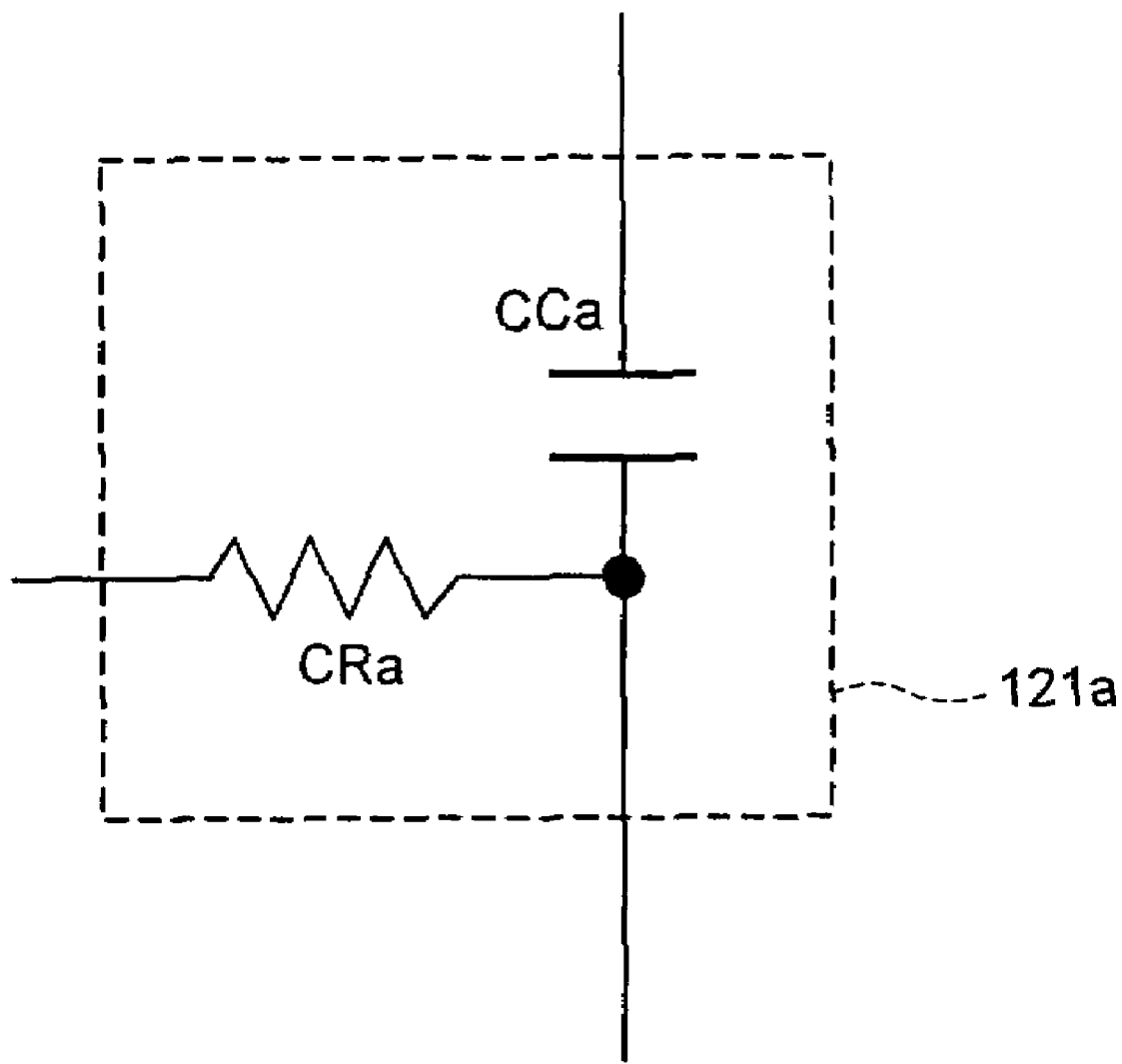
FIG. 15 is a diagram showing a schematic structure of a signal superimposing unit.

FIG. 15 is an example of a structure of the signal superimposing unit 121a. The signal superimposing unit 121a includes a coupling resistor CRa and a coupling capacitor CCa. The driving signal generator 112a is connected to the driving and sensing electrode 105a via the coupling resistor CR. The reference signal generator 120a is connected to the driving and sensing electrode 105a via the coupling capacitor CCa.

In a low frequency range which is a band of the driving signal generated by the driving signal generator 112a, the coupling capacitor CCa can be considered to be almost disconnected. Therefore, the driving signal which is generated by the driving signal generator 112a is applied to the driving and sensing electrode 105a.

Moreover, in a high frequency range (band) which is a band of the reference signal generated by the reference signal generator 120a, an impedance of the coupling capacitor CCa becomes sufficiently low as compared to a resistance of the coupling resistor CRa. Therefore, the reference signal generated by the reference signal generator 120a is applied to the driving and sensing electrode 105a.

When the full frequency band is taken into consideration summing up the abovementioned description, it is equivalent to the driving signal of the low frequency and the reference signal of the high frequency being superimposed and then applied to the driving and sensing electrode 10a. In the first embodiment, a use of the frequency of the reference signal sufficiently higher than the frequency of the driving signal is made, and a circuit which includes the coupling resistor, CRa and the coupling capacitor CCa as shown in FIG. 15 is used. Accordingly, it is possible to apply a high voltage and detect the electrostatic capacitance easily on the same electrode, without using a high-voltage amplifier.

(Capacitance Detecting Circuit)

Figure 16:
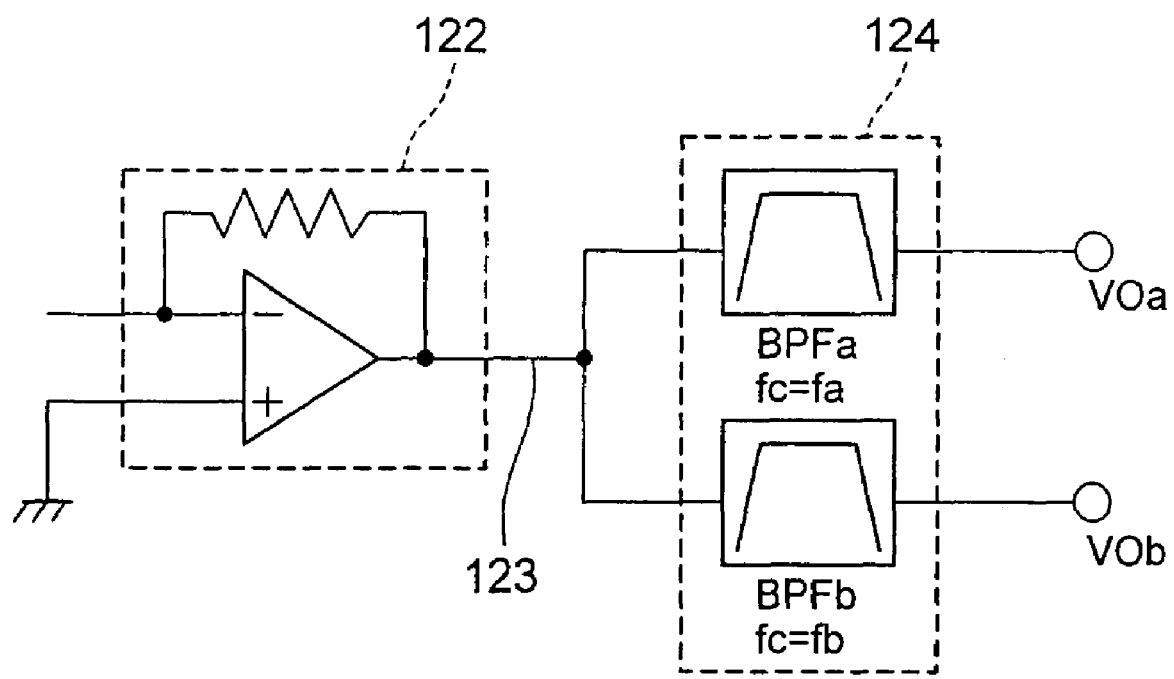
FIG. 16 is a diagram showing a schematic structure of a capacitance detecting circuit and a detection signal separating unit.

FIG. 16 shows an example of a structure of the capacitance detecting circuit 122 and the detecting signal separating unit 124. The capacitance detecting circuit 122 is a circuit which detects a current output by the COM electrode 110. The capacitance detecting circuit 122 includes a differential amplifier and a resistor, for example.

The capacitance detecting circuit 122 inputs a signal which is output by the COM electrode 110, and outputs the full capacitance detection signal 123. The full capacitance detection signal 123 is input to the detection signal separating unit 124. The detection signal separating unit 124 outputs the capacitance detection signals VOa and VOb.

(Detection Signal Separating Unit)

The detection signal separating unit 124, when the peculiar characteristics (identifying factors) of the reference signals Sa and Sb are let to be a frequency for example, can be formed by two band-pass filters BPFa and BPFb, each having a different pass-band frequency as shown in FIG. 16.

Moreover, a pass central frequency (fc) of the band-pass filter BPFa is set to be fa, and a pass central frequency (fc) of the band-pass filter BPFb is set to be fb. Furthermore, a signal generated by the reference signal generator 120a shown in FIG. 12 is let to be a sinusoidal wave of a frequency fa. A signal generated by the reference signal generator 120b is let to be a sinusoidal wave of a frequency fb.

The full capacitance detection signal 123 which is output from the capacitance detecting circuit 122 shown in FIG. 12 is a signal in which the signal of the frequency fa and the signal of the frequency fb are superimposed. The band-pass filter BPFa in the detection signal separating unit 124 extracts only a component of the frequency fa from the full capacitance detection signal 123. Accordingly, the capacitance detection signal VOa which varies based on the electrostatic capacitance between the driving and sensing electrode 105a and the COM electrode 110, is output.

Similarly, the capacitance detection signal VOb which varies based on the electrostatic capacitance between the driving and sensing electrode 105b and the COM electrode 110 is output from the band-pass filter BPFb in the detection signal separating unit 124.

According to the structure of the first embodiment, it is possible to detect simultaneously the capacitance detection signals VOa and VOb from the detection signal separating unit 124. Therefore, it is possible to achieve the capacitance detection signal corresponding to the plurality of driving and sensing electrodes 105a and 105b in a short time, particularly at the same time.

The capacitance detection signals VOa and VOb show an amount of deformation of the deformable section at a position facing the driving and sensing electrodes 105a and 105b respectively. By integrating the capacitance detection signals VOa and VOb, it is possible to detect the deformed shape at the position facing the driving and sensing electrodes 105a and 105b respectively. In other words, it is possible to determine the shape of the reflecting surface 101.

Moreover, the plurality of capacitance detection signals VOa corresponding to each driving and sensing electrode 105a and 105b can be detected continuously, particularly simultaneously. In other words, it is possible to detect simultaneously the deformed shape at different positions of the reflecting surface 101. Consequently, it is possible to use as a means for monitoring continuously, particularly simultaneously, the deformed shape at different positions of the reflecting surface 101. Moreover, by using the capacitance detection signal VOa, it is also possible to control the deformed shape of the reflecting surface 101.

Thus, in the first embodiment, the reference signal having a peculiar frequency and phase which is capable of identifying each of the driving and sensing electrodes 105a to 105e for each of the driving and sensing electrodes 105a to 105e as mentioned above, is applied. Moreover, a value of the electrostatic capacitance which is generated between the COM electrode 110 (first electrode) and the driving and sensing electrodes 105a to 105e is detected, and the capacitance detection signal is generated.

In the capacitance detection signal which is output from the driving and sensing electrodes 105a to 105e, the capacitance detection signals of all the driving and sensing electrodes 105a to 105e are superimposed. Next, the superimposed capacitance detection signal is passed to (through) the detection signal separating unit 124 (detection signal separating means). Accordingly, it is possible to achieve the capacitance detection signal corresponding to each of the driving and sensing electrodes 105a to 105e.

According to this structure, by using the reference signal peculiar to each of the driving and sensing electrodes 105a to 105e, it is possible to find from the capacitance detection signal which is obtained upon superimposing, the capacitance detection signal corresponding to each of the driving and sensing electrodes 105a to 105e simultaneously by the detection signal separating unit 124. Therefore, it is possible to measure continuously, particularly simultaneously, the capacitance corresponding to the driving and sensing electrodes 105a to 105e. As a result of this, it is possible to find simultaneously, the shape of the reflecting surface at a plurality of positions, based on the respective capacitance signal.

SECOND EMBODIMENT

Figure 17:
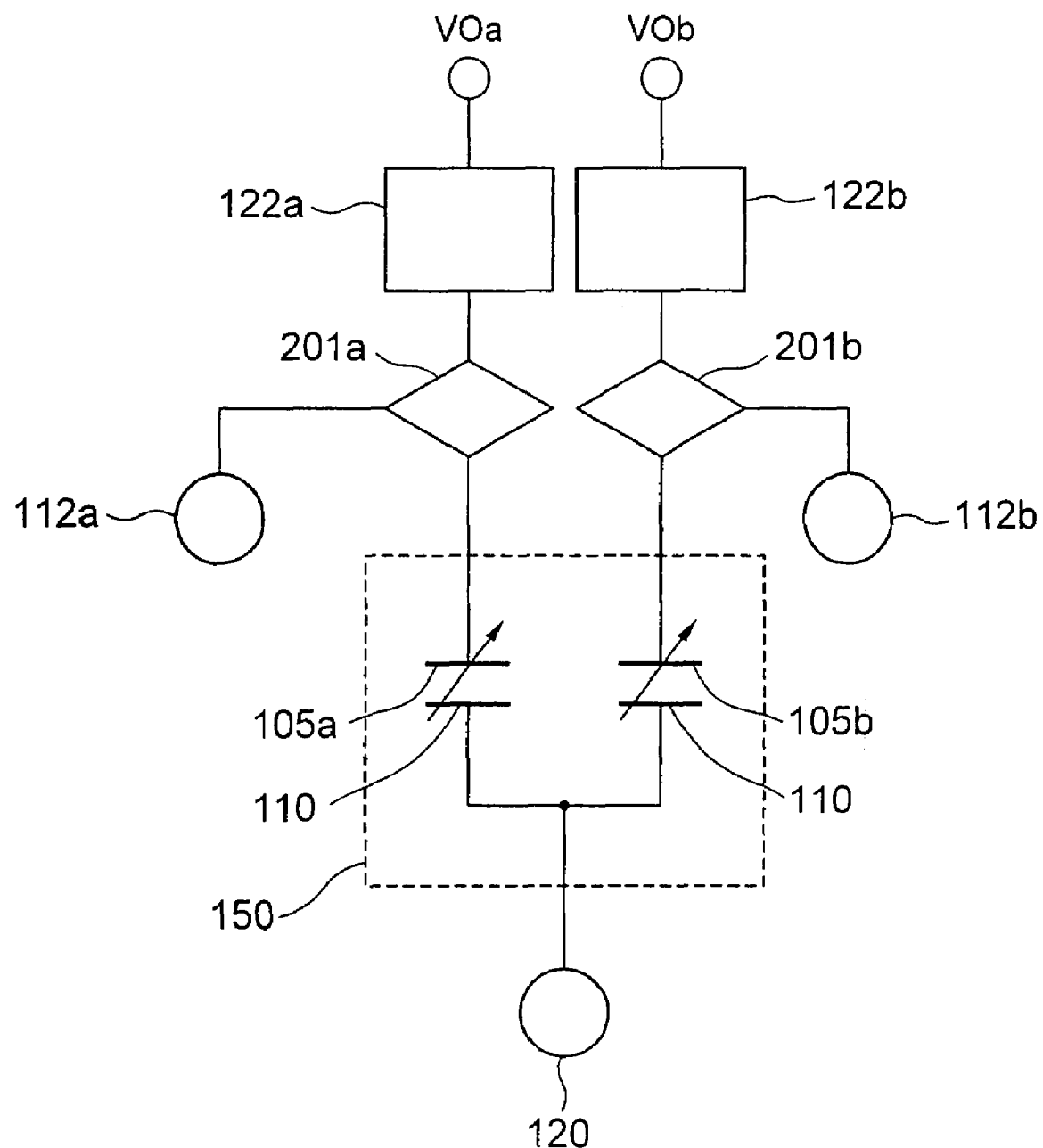
FIG. 17 is a block diagram describing a capacitance detecting circuit of a second embodiment.

Next, a deformable mirror according to a second embodiment of the present invention will be described below. FIG. 17 is a block diagram showing a circuit for detecting the capacitance of the deformable mirror according to the second embodiment. A concept of the equivalent circuit corresponding to the deformable mirror and an effect thereof, are same as in the description made by using FIG. 1 to FIG. 11 in the first embodiment. Therefore, same reference numerals are assigned to the same components, and the description to be repeated is omitted.

Moreover, similarly as in the first embodiment, the circuit block diagram is described by giving an example including two driving and sensing electrodes 105a and 105b. Here, the corresponding driving signal generator 112b, the reference signal generator 120, and an output signal separating unit 201b are connected to the driving and sensing electrode 105b by a structure same as the circuit related to the driving and sensing electrode 105a which will be described later. Therefore, in the following description, the description is made with reference to an example of driving by using the driving and sensing electrode 105a.

In FIG. 17, the deformable mirror unit 156 is driven by applying the driving signal (voltage) which is generated by the driving signal generator 112a, to the driving and sensing electrode 105a. Moreover, the reference signal generator 120 which generates the reference signal is connected to the COM electrode 110.

The reference signal is a signal having the periodicity similarly as in the first embodiment. In the second embodiment, a case in which a sinusoidal wave is used is described. However, without restricting to the sinusoidal wave, a case of using any waveform such as the rectangular wave, a triangular wave, and further a periodic wave can be taken into consideration. The frequency band of the reference signal is same as the band described in the first embodiment.

A capacitance detecting circuit 122a and the driving signal generator 112a are connected to the driving and sensing electrode 105a via an output signal separating unit 201a. The reference signal is an output signal which is changed based on a change in the capacitance between the COM electrode 110 and the driving and sensing electrode 105a, and is input to the capacitance detecting circuit 122a. The capacitance detecting circuit 122a converts this output signal to the capacitance signal. The driving signal generator 112a generates the driving signal (voltage) to be applied to the driving and sensing electrode 105a. The output signal separating unit 201a separates the output signal and the driving signal.

According to this structure, the output signal is transmitted to the capacitance detecting circuit 122a and also the driving signal is transmitted to the driving and sensing electrode 105a, by the output signal separating unit 201a.

In this detecting structure, unlike in the first embodiment, there is only one reference signal. The reference signal from the COM electrode 110 changes according to the change in the capacitance between the driving and sensing electrodes 105a and 105b, and the COM electrode 110. Output signals a and b, which are changed in accordance with the change in the capacitance are generated in the driving and sensing electrodes 105a and 105b.

The output signals a and b are guided to the corresponding capacitance detecting circuit 122a and 122b via the output signal separating units 201a and 201b respectively. The capacitance detecting circuits 122a and 122b output the capacitance detection signals VOa and VOb in accordance with the output signals a and b. In this manner, by only one reference signal, it is possible to achieve the plurality of capacitance detection signals VOa and VOb in accordance with a displacement of the plurality of driving and sensing electrodes 105a to 105b respectively.

Consequently, it is possible to detect simultaneously the capacitance detection signals VOa and VOb from the capacitance detecting circuits 122a and 122b. Therefore, it is possible to achieve the capacitance detection signals VOa and VOb corresponding to the plurality of driving and sensing electrodes 105a and 105b in real time.

The capacitance detection signals VOa and VOb indicate an amount of deformation of the deformable section at a position facing each of the driving and sensing electrodes 105a and 105b. By integrating each of the capacitance detection signals VOa and VOb, the deformed shape at the position facing each of the driving and sensing electrodes 105a and 105b becomes clear. In other words, it is possible to know the shape of the reflecting surface 101.

Moreover, it is possible to detect continuously, particularly simultaneously, the plurality of capacitance detection signals VOa and VOb corresponding to each of the driving and sensing electrodes 105a and 105b. In other words, it is possible to detect simultaneously, the deformed shape at various position of the reflecting surface 101. Consequently, it is possible to use as a means for monitoring continuously, particularly, simultaneously, the deformed shape at different positions of the reflecting surface 101. Moreover, by using the capacitance detection signal VOa, it is also possible to control the deformed shape of the reflecting surface 101.

In this system, as compared to the first embodiment, one reference signal generator 120 corresponding to one deformable mirror unit 150 is to be provided. Furthermore, the detection signal separating unit 124 is not required. Therefore, in addition to the effect similar as in the first embodiment, a point that the structure of the detecting circuit can be simplified is an advantage.

Next, a capacitance detecting circuit and an output signal separating unit in the second embodiment will be described below.

Figure 18:
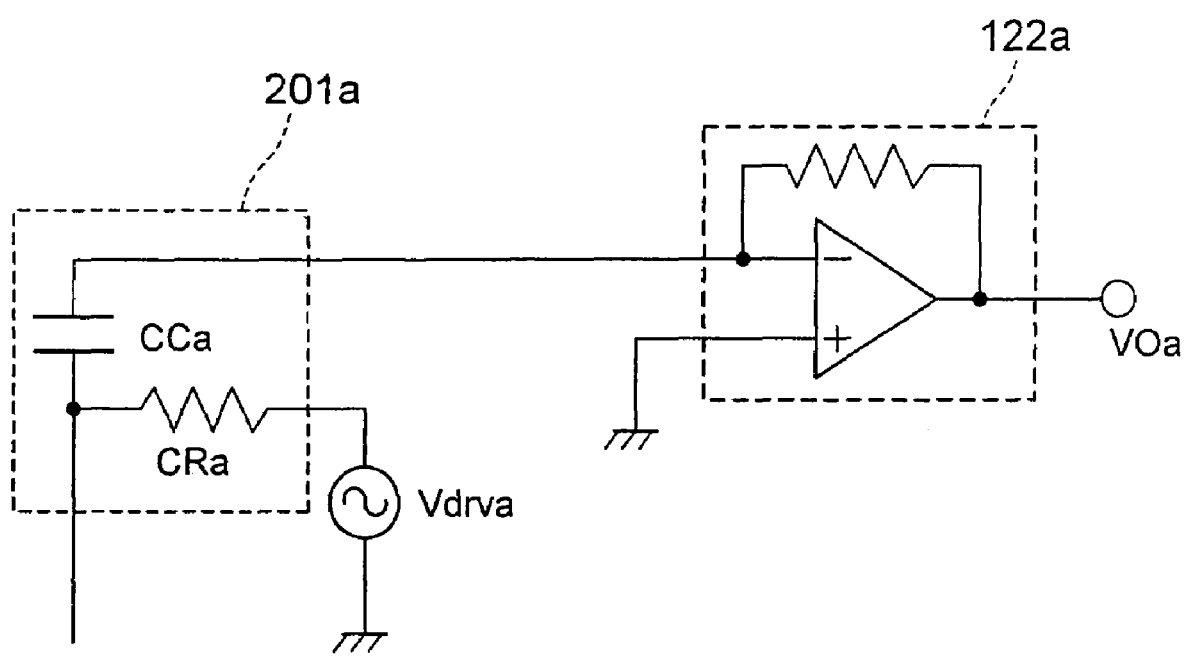
FIG. 18 is a diagram showing a schematic structure of an output signal separating unit and the capacitance detecting circuit.
Figure 19:
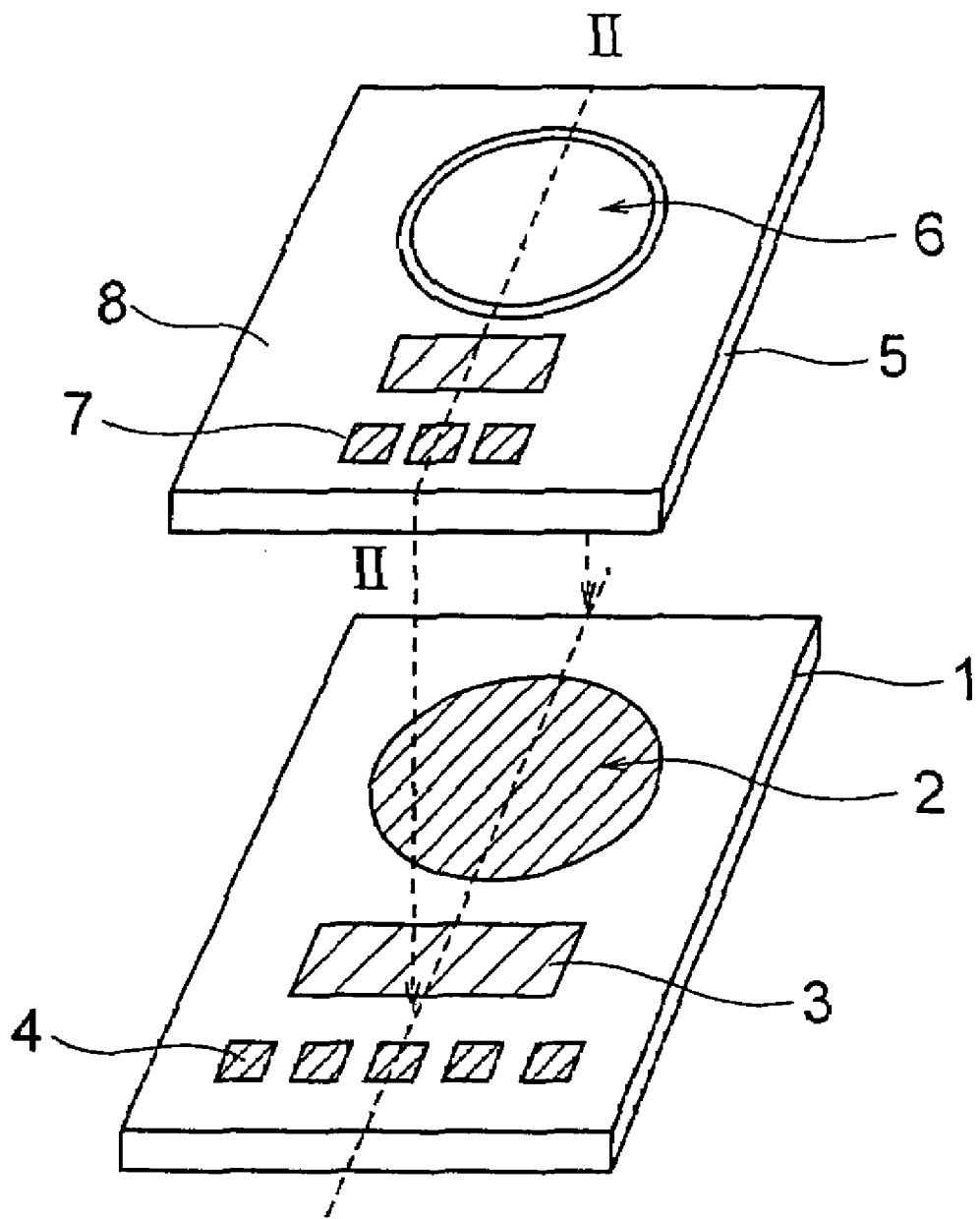
FIG. 19 is a diagram showing a structure of a conventional deformable mirror.
Figure 20:
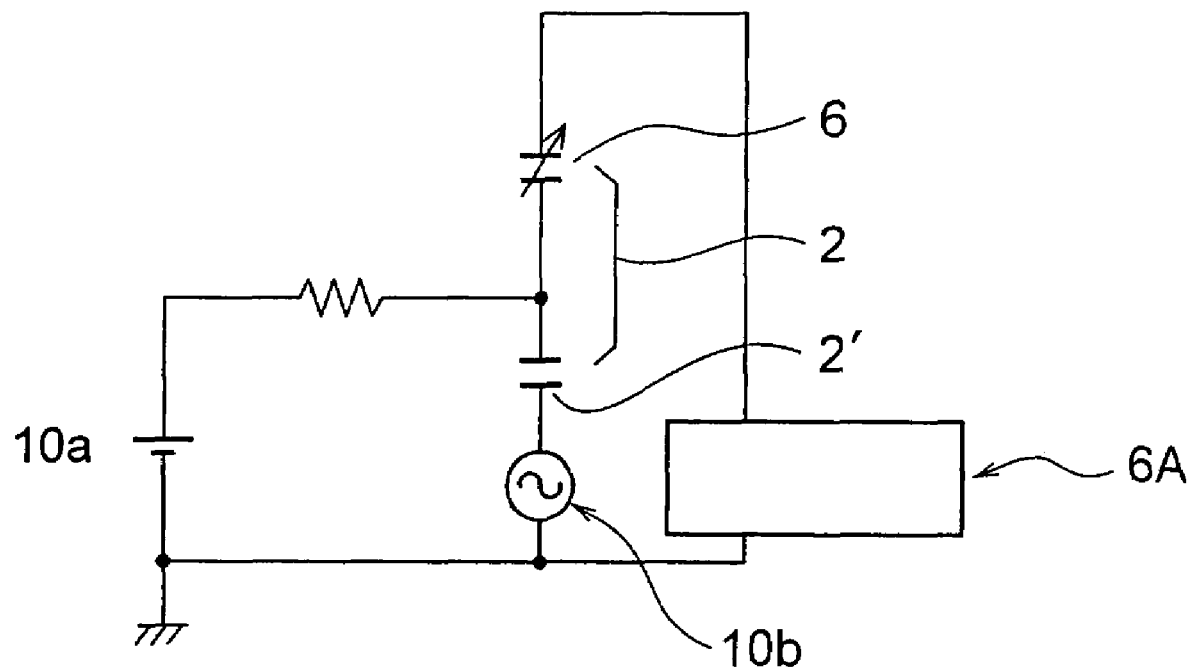
FIG. 20 is a diagram showing a structure of a capacitance detecting circuit of the conventional deformable mirror.

The capacitance detecting circuit 122a being similar to the structure in the first embodiment, the description to be repeated is omitted. Next, the output signal separating unit 201a will be described in detail. FIG. 18 shows a schematic structure of the output signal separating unit 201a. The output signal separating unit 201a includes the coupling resistor CRa and the coupling capacitor CCa.

The output signal separating unit 201a is connected to the driving signal generator 112a and the capacitance detecting circuit 122a. The output signal separating unit 201a has a function of separating the output signal a, which is output from the driving and sensing electrode 105a, while applying a driving signal Vdrva.

The driving signal generator 112a is connected to the driving and sensing electrode 105a via the coupling resistor CRa. Moreover, the capacitance detecting circuit 122a is connected to the driving and sensing electrode 105a via the coupling capacitor CCa.

In a low-frequency area in which the driving signal Vdrva generated by the driving signal generator 112a exists, the coupling capacitor CCa can be considered to be almost open. Therefore, the driving signal Vdrva is applied to the driving and sensing electrode 105a without being applied to the capacitance detecting circuit 122a.

Moreover, the output signal from the driving and sensing electrode 105a is a current signal of a frequency band same as a frequency band of the reference signal. This frequency is higher as compared to a frequency of the driving signal Vdrva. In a high-frequency range in which the reference signal generated by the reference signal generator 120 exists, an impedance of the coupling capacitor CCa becomes sufficiently low as compared to a resistance of the coupling resistor CRa. The current signal which is the output signal is input to the capacitance detecting circuit 122b via the coupling capacitor CCa.

When the full frequency band is taken into consideration summing up the abovementioned description, the driving signal Vdrva of low frequency is not applied to the capacitance detecting circuit 122a, and is applied to the driving and sensing electrode 105a. Moreover, the current signal which is output from the driving and sensing electrode 105a is input to the capacitance detecting circuit 122a.

In this manner, a use of the frequency of the reference signal sufficiently higher than the frequency of the driving signal Vdrva is made, and a circuit which includes the coupling resistor CRa and the coupling capacitance CCa as shown in FIG. 18 is used. Accordingly, it is possible to apply the high voltage and detect the electrostatic capacitance easily, without using a high-voltage amplifier.

As it has been described above, in the second embodiment, one reference signal is applied to the COM electrode 110 (first electrode). Then, the capacitance between the COM electrode 110 and the driving and sensing electrodes 105a and 105b (second electrodes) is detected by the capacitance detecting circuits 122a and 122b which are provided to the driving and sensing electrodes 105a and 105b respectively.

According to this structure, only by connecting the capacitance detecting circuits 122a and 122b to the driving and sensing electrodes 105a and 105b respectively, it is possible to achieve simultaneously, the capacitance detection signal corresponding to each of the driving and sensing electrodes 105a and 105b directly. Therefore, the circuit structure is simple, and it is possible to measure continuously, particularly simultaneously, the capacitance corresponding to (in accordance with) each of the driving and sensing electrodes 105a and 105b. As a result of this, it is possible to find simultaneously the shape of the reflecting surface at the plurality of positions, based on each of the capacitance signals.

In each of the embodiments, the number of driving and sensing electrodes, in other words, the number of a plurality of areas in which the reflecting surface is deformed and driven independently is not restricted to abovementioned number, and may be arbitrary when there is a plurality of areas. It is needless to mention that as the number of the driving and sensing electrode increases, an effect of the present invention becomes remarkable. Moreover, in each of the embodiments, by feeding back the capacitance detection signal which is output from the capacitance detector, to a drive system including the driving signal generator, it is possible to control the shape of the reflecting surface highly accurately. At this time, it is preferable that a capacitance target signal which is subjected to comparison with the capacitance detection signal is a signal which is input from an outside of a feedback loop, and is let to be a signal after performing a compensation process based on a nonlinearity of the capacitance detection signal. Accordingly, rather than a structure which does not perform a nonlinear compensation process at all, a followingness of the control is improved, as well as, even when compared with a structure which performs the nonlinear compensation process in the feedback loop, it is possible to make a change and an addition of parameters related to the nonlinear compensation process with even higher degree of freedom. It is needless to mention that such nonlinear compensation process is applicable with no dependence on the number and the shape of the driving and sensing electrodes. Thus, the present invention can have various modified embodiments which fall within basic teaching herein set forth.

The deformable mirror according to the present invention shows an effect that it is possible to detect simultaneously the amount of deformation at various positions of the reflecting surface.

Thus, the deformable mirror according to the present invention is useful as a deformable mirror with a structure having a plurality of control electrodes, and particularly, is appropriate for measuring and controlling simultaneously the deformed shape at a plurality of positions of the reflecting surface.

What is claimed is:

1. A deformable mirror comprising:
    a deformable section on which a reflecting surface and a first electrode are formed;
    a fixing section which fixes the deformable section;
    a plurality of second electrodes which are provided facing the first electrode;
    a driving force generating unit which drives the deformable section by applying an electric potential difference between the first electrode and each second electrode; and
    a capacitance detecting unit which detects simultaneously a plurality of capacitances between the first electrode and the second electrodes.

2. The deformable mirror according to claim 1, wherein the capacitance detecting unit includes
    a reference signal applying unit which applies individually to the second electrode a reference signal having an identifying factor necessary for operation of the capacitance detecting unit,
    a capacitance detecting unit connected to the first electrode, which detects a full capacitance detection signal in which, a capacitance between the first electrode and the plurality of second electrodes is superimposed, by using the plurality of reference signals, and
    a detection signal separating unit which separates the full capacitance detection signal into capacitance detection signals corresponding to each of the second electrodes, based on the identifying factor.

3. The deformable mirror according to claim 2, wherein an identifying factor is a frequency, and
    the detection signal separating unit separates the signal based on the frequency.

4. The deformable mirror according to claim 2, wherein an identifying factor is a phase, and
    the detection signal separating unit separates the signal based on the phase.

5. The deformable mirror according to claim 1, wherein the capacitance detecting unit includes a reference signal generating unit which applies to the first electrode a reference signal necessary for an operation of the capacitance detecting unit, and a capacitance detecting circuit, which is connected to each of the second electrodes, and which detects the capacitance between the first electrode and the second electrodes.

* * * * *